United States Patent [19]

Guter

[11] Patent Number: 4,479,877

[45] Date of Patent: Oct. 30, 1984

[54] REMOVAL OF NITRATE FROM WATER SUPPLIES USING A TRIBUTYL AMINE STRONG BASE ANION EXCHANGE RESIN

[75] Inventor: Gerald A. Guter, Bakersfield, Calif.

[73] Assignee: The United States of America as represented by the Administrator Environmental Protection Agency, Washington, D.C.

[21] Appl. No.: 518,172

[22] Filed: Jul. 28, 1983

[51] Int. Cl.$^3$ .................................................. C02F 1/42
[52] U.S. Cl. ..................................... 210/670; 210/683; 210/903
[58] Field of Search ......................... 210/670, 683, 903

[56] References Cited

U.S. PATENT DOCUMENTS

| | | | |
|---|---|---|---|
| 2,597,440 | 5/1952 | Bodamer | 260/85.1 |
| 2,614,099 | 10/1952 | Bauman et al. | 260/88.1 |
| 2,723,245 | 11/1955 | Wheaton | 260/2.1 |
| 2,788,331 | 4/1957 | Greer et al. | 260/2.1 |
| 4,134,861 | 1/1979 | Roubinek | 521/32 |

OTHER PUBLICATIONS

Chemical Abstract 95:12492m, "Unusual Selectivity of a Commercial Ion-Exchange Resin with Respect to Nitrate Exchange", Michael Cox et al, p. 345.
EPA Quarterly Report, Oct.-Dec. 1980 (reference no. 1A).
EPA Quarterly Report, Jan.-Mar. 1981 (reference no. 1B).
Dennis A. Clifford, "Nitrate Removal from Water Supplies by Ion Exchange", EPA-600-2/78-052, Jun. 1978, pp. 48, 49 & 125.
Buelow, R. W. et al, "Nitrate Removal by Anion-Exchange Resins", *Journal AWWA*, Sep. 1975, pp. 528-534.

*Primary Examiner*—Ivars Cintins

[57] ABSTRACT

The invention relates to a method for separating nitrate from waters containing a significant amount of sulfate ion. Nitrate removal is accomplished by passing the water to be treated through a bed of a strong-base anion exchange resin which is a tributyl amine derivative of a copolymer exemplified by styrene-divinyl benzene. The tributyl species has been found to have an unusually high selectivity for nitrate over sulfate and provides not only a high capacity for nitrate removal but also economies in regeneration due to the ability to operate with only a partially regenerated resin bed.

8 Claims, No Drawings

REMOVAL OF NITRATE FROM WATER SUPPLIES USING A TRIBUTYL AMINE STRONG BASE ANION EXCHANGE RESIN

BACKGROUND OF THE INVENTION

Not all harmful impurities in potable waters are detectable by taste and/or odor. Nitrates, for example, are undetectable by the senses yet them may be physiologically harmful. In humans, especially in infants, consumed nitrates may be reduced to nitrites in the gastrointestinal tract. Upon absorption into the bloodsteam, nitrites react with hemoglobin to produce methemoglobin, which impairs oxygen transport.

The presence of nitrate in municipal water supplies is becoming an urgent problem in some locations at its level increases due to the use of nitrogen fertilizers and to pollution.

Investigators of nitrate ion exchange phenomena are familiar with the interference other ions exert on nitrate removal by anion resins. All major anions found in groundwater consume resin capacity although not to the same degree. This reduces nitrate removal efficiency of the resin and increases the quantity of regenerant chemicals. It is understandable that various investigators have sought some ideal "nitrate-selective resin" as a remedy for the observed process inefficiencies and complexities. Such a resin could remove nitrate ions only and allow other anions to pass; thus preserving some original qualities of the untreated water. At the end of the run, the resin would be nitrate loaded making the regeneration of resin more efficient. However, in practice with available resins, interfering ions cannot only alter the quality of product water but also present the possibility of producing a higher nitrate level if the nitrate breakthrough is exceeded. This latter effect is called "reverse adsorption" or "autoregeneration" and can occur if sulfate ion is present. The product water differs from treated water by having bicarbonate, nitrate, and sulfate partially or completely replaced by chloride. In some cases, this can result in a water exceeding secondary chloride standards and a water low in bicarbonate and high in pH and corrosivity. The higher the affinity of the resin for nitrate compared to other ions, the fewer product water quality problems will be encountered.

The presence of significant amounts of dissolved sulfate ion (about 50 ppm or more), in particular, has been an impediment to nitrate removal. A review of work on nitrate removal by strongbase ion exchangers is given by Gauntlet. (Gauntlet, R. B., "Nitrate Removal From Water By Ion Exchange, Water Treatment and Examination", *Water Treatment and Examination*, Vol. 24, Part 3 (1975), pp. 172f.) The early work reported by Gauntlet shows that irrespective of the resin used sulfate ions were adsorbed more strongly by the resins. Using various resins and waters of varying nitrate and sulfate composition in column tests, it was demonstrated that resin capacity for nitrate decreased with increasing feedwater sulfate content. Gauntlet compared the chemical efficiency of complete column regeneration with partial regeneration and found much better efficiency for partial regeneration for high sulfate waters and moderate improvement for low sulfate waters. He believed that complete regeneration of a single bed to have the disadvantage of producing a corrosive high chloride to alkalinity ratioed product.

An ion exchange plant for nitrate removal was put into operation in 1969 in Garden City Park, N.Y. (Sheinker, M., and J. Codoluto, "Making Water Supply Nitrate Removal Practicable", *Public Works*, June, 1977, pp. 71f.) The plant uses a strong-base anion exchange resin in a continuous flow loop system (Higgins, I. R., "Continuous Ion Exchange Equipment", *Ind. and Eng. Chem.*, 53, 1961, p. 336.) The influent water has a 14.9 mg/nitrate nitrogen content. No sulfates are reported but are believed to be quite low.

Midkiff, W. S., and W. J. Weber, "Operating Characteristics of Strong Base Anion Exchange Reactors", *Engineering Bulletin*, Prudue University Extension Service, 1970, 37, 593–604, reported significant work on nitrate removal with DOWEX 21K strong-base anion resin. Column operation was examined for a water containing both nitrate and sulfate.

Korngold, E., "Removal of Nitrates from Potable Water by Ion Exchange", *Wat. Air Soil Pollution*, 1973, 2, 15–22, reports experiments with Amberlite-400 and high chloride, low sulfate nitrate laden waters. His results show typical breakthrough curves for the four major anions. Of major interest is his brief study on the use of seawater as a regenerant.

Buelow, R. W. et al, "Nitrate Removal by Anion-Exchange Resins", *Journal AWWA*, September 1975, pp. 528f, investigated a reported nitrate selective resin and how specific anions interfere with anion resins in nitrate removal service. The DOWEX 21K which was reported as "nitrate selective" by Chemical Separations Corporation did not show nitrate selectivity in waters of TDS (total dissolved solids) concentrations of about 500 ppm. At high TDS levels, the resin did show nitrate selectivity. This was pointed out to be expected because of the monovalent ion preference in feedwaters of high ionic concentrations. Sulfate, iron, and silica were pointed out to be the most problematical.

Dalton, G. L., "The Removal by Ion Exchange of Nitrates From Borehole Water at Aroab SWA", report of the National Institute for Water Research, Pretoria, 1978, studied the application of nitrate removal by ion exchange to waters in the Republic of South Africa and southwest Africa. Amberlite IRA 904 resin was selected from 32 resins as having the highest nitrate-to-sulfate selectivity and was used in pilot plant tests. The waters tested were of high TDS allowing electroselectivity effects to give high nitrate-to-sulfate selectivity.

Grinstead, R. R., and K. C. Jones, "Nitrate Removal from Wastewaters by Ion Exchange", EPA report 17010FSJ01/71, January 1971, reported studies on porous polymer beads carrying alkyl substituted amidines. Typical $K_{Cl}^N$ values ranged from 15 through 40 and log $K_S^N$ values were 5 to 6 (NSS=1.69 to 2.69). Their object was to increase $K_{Cl}^N$ of an ion exchanger for removal of nitrate from wastewaters of high chloride content and thereby obtain better efficiency. Loss of extractant from the polymer beads to the product stream and the low ion exchange capacity of the resin of below 0.2 eq/l were the observed disadvantages of the process. The high $K_{Cl}^N$ of the resin precluded the possibility of obtaining high nitrate concentrations in the waste regenerant.

U.S. Pat. No. 4,134,861 issued to Roubinek (Diamond Shamrock) adopted the amidine approach of Grinstead and Jones. The patent describes a method of resin preparation by introduction of the amidine groups into a preformed polymer which is preferably a vinyl polymeric matrix cross-linked by divinylbenzene, resulting in the recurring structure —CH$_2$—CHX—, wherein X is the amidine group. It was found that the best balance between nitrate selectivity and ease of regeneration is obtained when the total number of carbon atoms on the amidine was 5 to 7. Butyl and ethyl groups were generally preferred. K$_{Cl}^N$ values were reported to be 7 to 10. No K$_S^N$ values were reported nor were any column tests or regeneration efficiencies reported.

Clifford, D. A., and W. J. Weber, "Nitrate Removal From Water Supplies by Ion Exchange", EPA-600/2-78-052, June 1978, reported an exhaustive study comparing the ionic selectivities of 19 strong-base and 13 weak-base commercial resins. They found that for groundwaters having TDS concentrations up to at least 3,000 ppm all resins preferred sulfate to nitrate. Clifford et al found that nitrate-to-sulfate selectivity among strong-base resins increased to some degree, dependent on the degree of cross-linking, but was unaffected by the number of carbon atoms surrounding the ammonium nitrogen atom. Clifford et al found the reverse to be true in the case of weak-base resins, i.e., that nitrate-to-sulfate selectivity increases with increasing R group size but that the degree of cross-linking in the substrate resin has no significant effect. The Clifford et al report also concluded (at page 6) that "Sulfate/nitrate selectivity was nearly irrelevant in determining the average equivalent fraction of nitrate on the resin at the end of a run" and that higher sulfate selectivity increases rather than decreases the amount of nitrate at the end of a column run. Thus, the findings of Clifford et al seem to lead to the conclusion that increases in nitrate/sulfate selectivity would not improve the column performance of resins for nitrate removal in the presence of sulfate. In any event, the commercial resins studied by Clifford et al did not show enough nitrate selectivity to be of significant value and should not be regarded as nitrate-to-sulfate selective (NSS) resins.

In summary, a need for anion exchange resin having significantly higher nitrate-to-sulfate selectivity remains a long-standing need in the art. If higher nitrate selectivity could be translated into a higher capacity for adsorbed nitrate, a NSS resin might offer significant regenerant savings because, in general, the more nitrate on a resin at the end of the run, the more nitrate will be removed per pound of regenerant. Whether or not a given resin is fully loaded with nitrate, 4 to 6 bed volumes of a 6 percent saline solution are required to effect regeneration. However, any increase in capacity which might be afforded by higher nitrate-to-sulfate selectivity might be partially or wholly offset by an increase in nitrate-to-chloride selectivity which would render the resin more difficult to regenerate. Such an offset was seen in the work of Walitt and Jones who incorporated nitrate analytical reagents into polystyrene to make an anion exchange resin selective for nitrate. They concluded "It appears that we have chosen to examine in depth a specific example of the proposed concept which was far too successful; that is, the affinity of the 1-naphthylmethylamine group (in the polystyrene resin) for nitrate ion is so great that regeneration to the free base by ordinary methods is unsuccessful." Walitt, A. L., and H. L. Jones "Basic Salinogen Ion-Exchange Resins for Selective Nitrate Removal from Potable and Effluent Waters", U.S. EPA, Cincinnati, Advanced Waste Treatment Laboratory, 1970, U.S. GPO, Washington, D.C. Thus, "nitrate selective" is terminology which can imply both advantages and disadvantages.

SUMMARY OF THE INVENTION

It has now been discovered that certain tributyl amine resins have a nitrate to sulfate selectivity which is sufficiently high that the removal of nitrate ions from municipal water supplies containing significant amounts of sulfate ions becomes economically feasible. These strongly basic quaternary ammonium anion resins may be represented by the following formula:

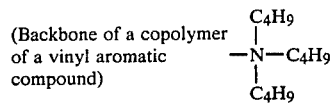

Experimental work has demonstrated that the tri-n-butyl derivative of the styrene-divinyl benzene copolymer, used as the resin intermediate in the commercial manufacture of DUOLITE A-104, (trademark of Duolite International) has a threshold value K$_S^N$ for nitrate to sulfate selectivity of about 10,000 and has demonstrated effective nitrate removal for flow rates over 45 gpm per square foot of bed area (2.75 BV per minute). These properties are significantly superior to those found for the trimethyl (K$_S^N$=100), trimethyl (K$_S^N$=1000) and tripropyl (K$_S^N$=1100) amine derivatives of the same copolymer.

Several ancilliary benefits deriving from the use of the tributyl amine resin have also been found. The tributyl amine resin has been found to remove less bicarbonate ions from the water and, accordingly, the effluent is less acidic and therefore less corrosive. Also, surprisingly, the tributyl species, unlike its lower alkyl homologues, has been found to have signifcant algicidal activity.

Contrary to any inference from the above-noted work of Clifford et al, the higher nitrate-to-sulfate selectivity afforded by the tri-butyl amine resin translates into a much higher capacity for the adsorption of nitrate and better column performance in the presence of sulfate. Unlike the commercial resins investigated by Clifford et al which exhibit nitrate breakthrough before sulfate breakthrough, the tributyl species used here gives sulfate breakthrough before significant nitrate leakage occurs.

The tri-butyl amine resin used in the present invention is a "nitrate-selective resin" which term as used herein means a resin which in a column operation with common groundwaters retains nitrate as the last ion to break through when exchanging ions at anionic strengths of 10 meq/l. The latter concentration is chosen as a convenient and practical concentration. At very low anion concentrations (especially sulfate), the term "nitrate-selective resin" loses practical significance or fades in importance because relatively large volumes of water can be treated with a given resin bed. At high concentrations, electroselectivity will produce the selectivity reversal; consequently, the column operation should be assessed at anion concentrations more typical of groundwaters, i.e., total dissolved solids (TDS) levels of 500–700 ppm or less. It is pointed out that the definition follows the normally observed breakthrough order when only monovalent ions are present.

The high nitrate absorption capacity (meq of nitrate retained on column at nitrate breakthrough) affords important advantages in terms of savings on capital investment for equipment and in savings from a reduced requirement for regenerant. The higher $K_S^N$ value reflects yet another advantage in that the column can be used through the sulfate breakthrough point, up to the nitrate breakthrough point, so that little or no regenerant is spent in removing the sulfate from the column.

Accordingly, the method of the present invention provides for removal of nitrate from waters containing a signifcant amount of sulfate ion, on the order of 50 ppm or more, and a TDS of about 1000 ppm or less (at such TDS levels electroselectivity is not a significant influence on nitrate-to-sulfate selectivity), by passing the water through a bed of a tributyl amine derivative of a copolymer of a monovinyl aryl compound and a polyolefinic cross-linking agent. The purified water is collected as the effluent from the resin bed. The resin bed is periodically washed with an aqueous salt solution for regeneration. Most preferably, in each cycle the nitrate removal is continued through the sulfate breakthrough point and then washed with the regenerant prior to the nitrate breakthrough point. Most preferably, each periodic wash is discontinued at a point where a substantial amount, i.e., about 10 percent or more, of the adsorbed nitrate is left on the resin when the resin column is returned to service.

Accordingly an object of the present invention is to provide for nitrate removal from potable water containing about 200 ppm or more nitrate, about 50 ppm or more sulfate and about 1000 TDS or less.

It is another object of the present invention to reduce nitrate levels in potable water to below about 10 mg per liter.

Yet another object of the present invention is to provide for higher nitrate-to-sulfate selectivity and nitrate adsorption capacity than previously realized without impairing regeneration.

Other objects and further scope of applicability of the present invention will become apparent from the detailed description to follow.

DESCRIPTION OF THE PREFERRED EMBODIMENT

The Resins

The backbone resins used as substrates to produce the tributyl anion exchange resins employed in the method of the present invention are copolymers of a (A) vinyl aryl compound and (B) a polyolefinic cross-lining agent. The monovinyl aromatic compounds are suitably vinyl aromatic hydrocarbons, such as styrene, ortho-, meta- and para-methyl and ethyl styrenes, vinyl naphthalene, vinyl anthracene and the homologues of these compounds. Styrene is preferred. Also, the monovinyl aryl moiety of the copolymer may consist of nuclear substituted chlorine or bromine substituted vinyl aryl compounds, such as the ortho-, meta- and para-chloro and bromo styrenes copolymerized with other diluting monovinyl aryl compounds. The preferred polyolefinic cross-linking agents are polyvinyl aromatic compounds, also selected from the benzene and naphthalene series. Examples of polyvinyl-aromatic compounds are divinylbenzene, divinyltoluene, divinylxylene, divinylnaphthalene and divinylethylbenzene.

The backbone resin used in applicant's studies to data is the styrene-divinyl benzene copolymer used as the resin intermediate in the commercial manufacture of DUOLITE A-104 (trademark of Duolite International) which may be characterized as a strong-base quaternary amine and as a type II hydroxyl-containing resin which is represented by the formula:

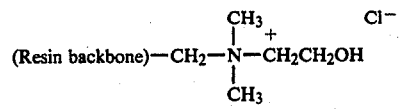

DUOLITE A-104 shows a preference for sulfate over nitrate ($K_S^N=50$). In the context of the present useage of the term, DUOLITE A-104 is not considered a nitrate-to-sulfate selective (NSS) resin.

Studies conducted by Clifford et al and by the present applicant indicate that higher amounts of divinylbenzene in the copolymer (15–20 wt %) provide increased porosity and cross-linking, which factor, in turn, favors nitrate-to-sulfate selectivity. These factors are believed to explain the higher nitrate-to-sulfate selectivity of AMBERLITE IRA-900, as compared with DUOLITE A-101D and A-104.

The anion exchange resins employed in the present invention may be formed by first reacting one of the aforementioned copolymers with a halogen in the presence of a halogenating catalyst to produce halomethyl radicals attached to aromatic nuclei in the resin in the manner more fully described in U.S. Pat. No. 2,614,099 issued Oct. 14, 1952 to W. C. Bauman et al, the teachings of which are incorporated herein by reference. The halogenated resin is then reacted with tributylamine, in the manner also taught by Bauman et al.

Nitrate Removal

The tributyl resin is utilized in a conventional manner for treatment of waters containing both nitrate and sulfate ions. Standard commercial water softening equipment may be used; however, some modification may be desirable to improve distribution of the influent flow and brine regenerant. Further, the resin column should be declassified by thorough mixing of the resin subsequent to downflow regeneration and prior to reuse.

Continuous nitrate removal may be achieved in the conventional manner by using a number of resin columns in parallel and switching the influent flow from one column to another as each column is, in turn, regenerated.

Suitable flow rates for influent and for regenerant are those conventionally used for other strong-base anion exchange resins.

Regeneration

The resins used in the method of the present invention, upon reaching the first nitrate breakthrough point, may be completely regenerated by washing with about 4 bed volumes (BV) of a 6 wt % NaCl Brine. The regenerant is preferably passed through the resin column in the same direction as the water undergoing treatment. While NaCl is an attractive regenerant from the viewpoint of material cost, this apparent economic advantage may be offset by the cost of disposal of the spent brine solution. In contrast, the use of calcium chloride as a regenerant produces a waste brine containing calcium nitrate and sulfate, both of which are disposable to agricultural lands. Ammonium chloride is also an attractive regenerant that gives an ammonium nitrate and sulfate-containing waste brine a significant agricultural value.

Because anion exchange resins are quite selective for sulfate ion, the presence of sulfate in raw water decreases the efficiency of the conventional resins to absorb nitrate. With the resin used in accordance with this invention, however, sulfate is easily removed from the spent resin by the sodium chloride regenerant in nearly stoichiometric proportions whereas excess regenerant is required for nitrate removal (5–10 moles of NaCl per mole of nitrate). Sulfate, by preventing a large build up of nitrate on the resin, promotes low nitrate leakage from a partially regenerated column. The overall effect of sulfate, however, is to increase the salt required to remove a unit quantity of nitrate per unit quantity of water treated. Applicant's studies have confirmed that large quantities of regenerant (20 pounds per cubic foot of resin) are required to remove most of the nitrate from the spent resin. Not all nitrate need be removed, however, to reduce nitrate levels in treated water to below 45 ppm.

Partial regeneration is highly desirable because more nitrate is removed per equivalent of salt regenerant than if complete regeneration is used. In a plot for mole fraction of nitrate remaining on the column during regeneration (vertical axis) vs. bed volumes of a given regenerant (horizontal axis) is examined, it will be seen that the amount of nitrate on the column drops off quite sharply for the initial quantities of regenerant used and then levels off drastically as the mole fraction of nitrate approaches zero. Accordingly, economies in the cost of the regenerant and in the disposal of the waste, nitrate-containing wash water can be realized by only partially regenerating, for example, to the point where about 10 percent or more of the adsorbed nitrate remains on the column. Further, by operating the column through the sulfate breakthrough point, which is possible because sulfate breaks through first using the tributyl species, the amount of regenerant expended in removing sulfate from the column can be substantially reduced.

The advantage of partial regeneration afforded by the present invention can be illustrated by assuming a feed water by having the following composition:

| Nitrate | = 1.5 MEQ/L | (93 PPM) |
|---|---|---|
| Sulfate | = 7.0 | (336 PPM) |
| Cl + HCO$_3$ | = 3.5 | |

Assuming that the nitrate level must be reduced to 35 ppm (0.56 meq/liter) the nitrate on the column must be reduced to a mole fraction of 0.35. A further reduction is not economical and therefore partial regeneration is preferred. At sulfate breakthrough, the nitrate level is determined by the $K_S^N$ value of the resins. With the tributyl resin of the present invention, at sulfate breakthrough, the nitrate in the effluent from the treatment of the above-described water, will be 35 ppm. Using the triethyl resin homologue having a $K_S^N$ of 1,000 to treat the same influent, the nitrate leakage after sulfate breakthrough would be about 75 ppm which is well in excess of the 35 ppm objective. Accordingly, using the triethyl species the nitrate removal cycle must be terminated prior to sulfate breakthrough. Thus, in the case of the triethyl species, the full nitrate absorbing capacity of the resin is not used and the process cannot take advantage of the nitrate selectivity of the resin. To take advantage of the nitrate selectivity of the triethyl resin complete regeneration is required which is substantially less economical.

Nitrate-to-Sulfate Selectivity—Experimental

Samples of resins were put in the nitrate form by passing one normal sodium nitrate solution through a column of each resin. The resins were supplied to us in the chloride form. A measured 5-ml sample of wet resin was placed in a bottle with meansured 150 ml of a sodium sulfate solution of about 50 meq/l. The tightly stoppered bottle was periodically shaken and allowed to stand overnight before sulfate and nitrate analyses were performed for both the resin phase and the aqueous phase. On the basis of these analytical results the values given in Table I below were calculated.

TABLE I

Properties of Resins[1] as Determined Experimentally

| No. & Designation | Moisture[2] Content (%) | Vol. Capacity[2] (eq/L) | $K_S^N$ (Approx.) | NNS[4] |
|---|---|---|---|---|
| 1 R—TM | 51.0 | 1.41 | 100 | −0.14 |
| 2 R—TE | 47.9 | 1.19 | 1,000 | +0.92 |
| 3 R—MDEOH | 41.1 | 1.41 | 10 | −1.15 |
| 4 R—EDEOH | 38.9 | 1.30 | 50 | −0.41 |
| 5 R—TEOH | 33.1 | 1.23 | 10 | −1.09 |
| 6 R—DEMEOH[3] | 45.7 | 1.42 | 50 | −0.45 |
| 7 R—DEEOH | 43.5 | 1.29 | 100 | −0.11 |
| 8 R—N—MM | 44.6 | 1.35 | 200 | +0.17 |
| 9 (Duolite A-101D) | (48 to 55) | (1.3) | (25) | −0.71 |
| 10 R—TP | 30.4 | 0.84 | 1,100 | +1.12 |
| 11 R—TB | 33.0 | 0.66 | 11,100 | +2.22 |

[1]All resins synthesized from the resin intermediate used in commercial manufacture of Duolite A-104
[2]Data supplied by Duolite International
[3]Same as Duolite A-104
[4]NSS = log $K_S^N$ − log $\overline{C}$ + 1
R represents the styrene-divinylbenzene copolymer used as the resin intermediate for DUOLITE A-104
TM - trimethyl
TE - triethyl
MDEOH - methyldiethoxy
EDEOH - ethyldiethoxy
TEOH - triethoxy
DMEOH - dimethylethoxy
DEEOH - diethylethoxy
N-MM -
TP - tripropyl
TB - tributyl

Column Performance—Experimental

The following conditions were chosen for the experimental column work:

| Column Size | 2-inch-ID by 4-foot length |
|---|---|
| Bed Depth | 24 inches |
| Cross-Sectional Area of Column | 3.14 in$^2$; 20.26 cm$^2$; 0.022 ft$^2$ |
| Bed Volume of Ion Exchange Resin | 1.245 ml; 0.044 ft$^3$ |

Ion exchange experiments were conducted with the five strong base anion exchange resins listed below in the 2-inch-diameter columns. Flow rates were held near ½ BV per minute. Water directly from a well near McFarland, Calif. was used either diluted with deionized water or undiluted to give the influent water compositions seen in Table II below.

An automatic sampler was constructed to obtain effluent samples at least once every 60 minutes. A flowmetering device was also constructed to record the flow rate through the column. This was necessary because it was observed that flow rate changes varied slightly over long periods of operation and required either frequent readjustment or automatic recording.

The resins, feed water compositions, and meq of sulfate passed and meq of nitrate retained (nitrate capacity) at nitrate breakthrough are given in Table II.

TABLE II

| Resin (see Table I for definition) | Influent Water* | | | | Meq of Sulfate passed by column (1 liter) before nitrate breakthrough** | Meq of Nitrate remaining on 1 liter of resin at breakthrough** |
|---|---|---|---|---|---|---|
| | meq/l | | Mole Fraction | | | |
| | Sulfate | Nitrate | Sulfate | Nitrate | | |
| DUOLITE A-101D | 7.29 | 1.21 | 0.56 | .093 | 0 | 211 |
| R-TE | 7.29 | 1.21 | 0.56 | .093 | 1050 | 321 |
| R-TP | 7.81 | 1.78 | 0.55 | 0.126 | 900 | 294 |
| R-TB | 7.5 | 1.77 | 0.54 | .128 | 2833 | 531 |
| R-TEOH | 6.67 | 1.21 | 0.54 | .098 | meq of nitrate passed by 1 liter column before sulfate breakthrough 107 | meq sulfate retained by 1 liter of resin at sulfate breakthrough 1134 |

*Meq chloride + Meq bicarbonate in each composition is approximately 4.5
**Calculated at breakthrough point for last ion to breakthrough
Breakthrough defined as point where concentration of breaking ion = ½ its influent concentration The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method for separating nitrate from a water containing sulfate and less than about 1000 ppm total dissolved solids, said method comprising passing the water through a bed of a particulate, strong-base anion exchange resin, said resin being a tributyl amine derivative of a copolymer of a monovinyl aryl compound and a polyolefinic cross-linking agent for adsorption of the nitrate onto said resin.

2. The method of claim 1 wherein said cross-linking agent is a polyvinyl aromatic hydrocarbon.

3. The method of claim 1 wherein said copolymer is a styrene-divinylbenzene copolymer.

4. The method of claim 1 wherein said water contains at least 50 ppm sulfate prior to contact with the ion exchange resin.

5. The method of claim 1 further comprising periodically washing said bed of particulate resin with an aqueous salt solution to regenerate said resin and permit its reuse.

6. The method of claim 5 wherein the salt in solution is sodium chloride.

7. The method of claim 5 wherein, prior to each periodic wash the nitrate adsorption step is continued through the sulfate breakthrough point and the resin bed is then washed for regeneration prior to the nitrate breakthrough point.

8. The method of claim 5 wherein each periodic wash is discontinued at a point where a substantial amount of nitrate remains adsorbed on said resin bed.

* * * * *